D. E. McSherry,
Grain Drill.
No. 100,602. Patented Aug. 23, 1870.
2 Sheets, Sheet 1.
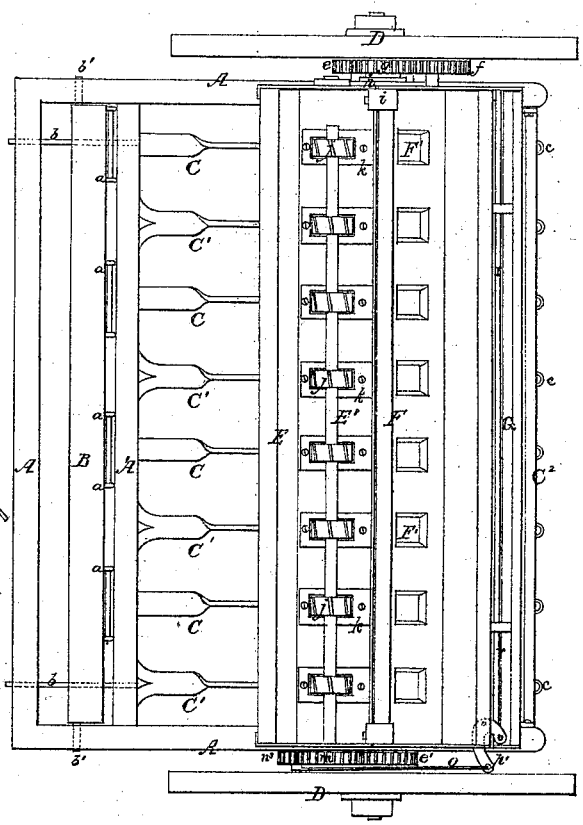
Fig. 1
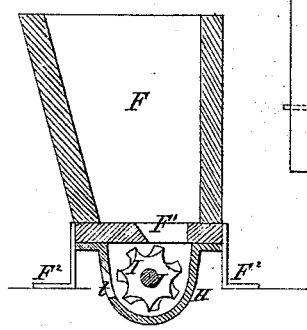
Fig. 3
Fig. 4
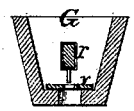
Fig. 5
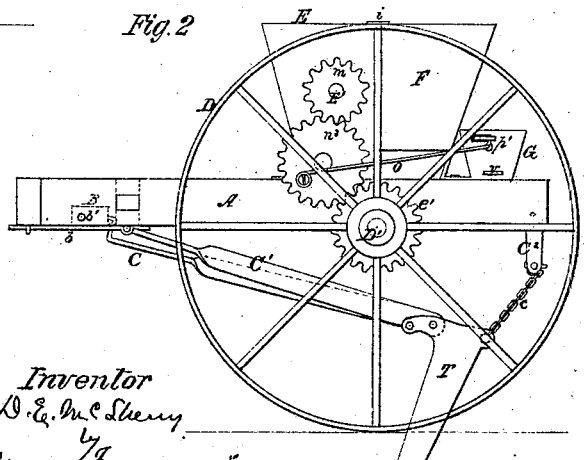
Fig. 2
Witnesses
R. T. Campbell
E. A. Campbell
Inventor
D. E. McSherry
by
Mason, Fenwick & Lawrence

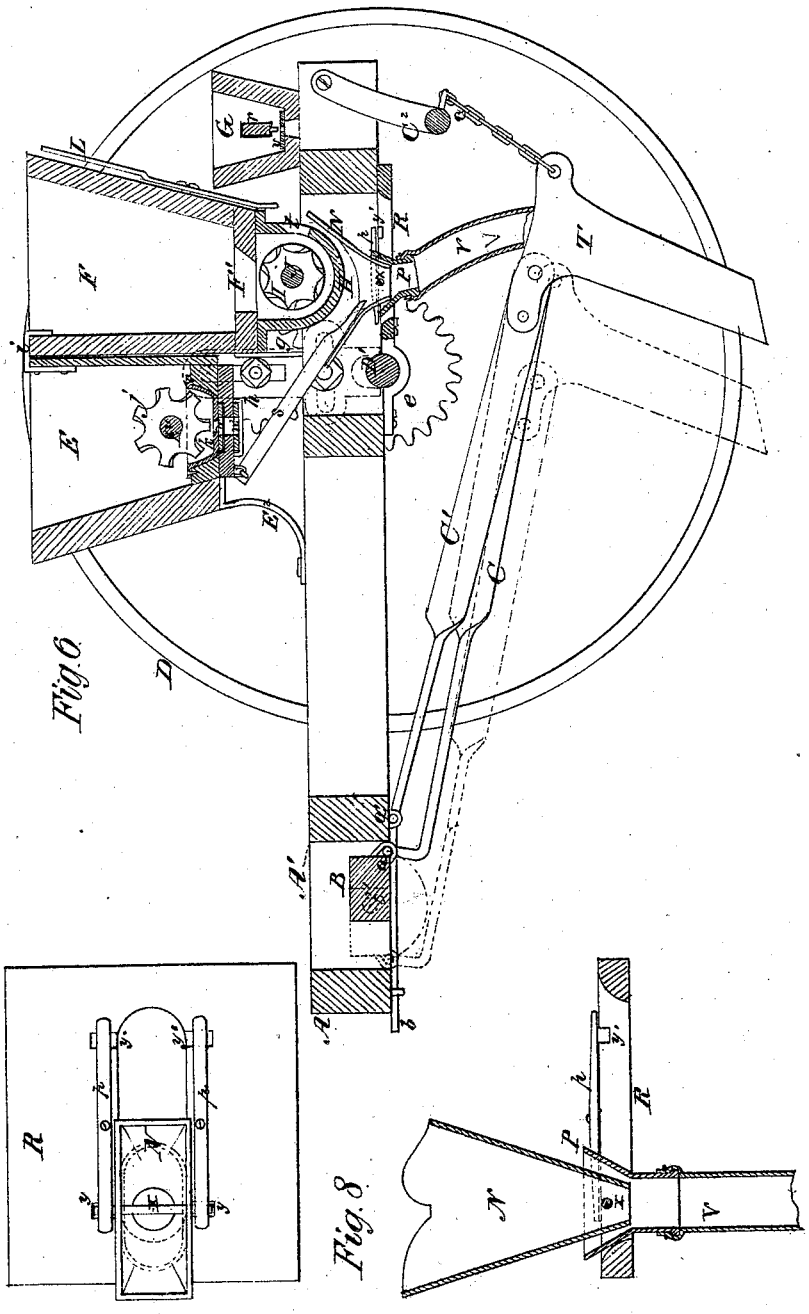

UNITED STATES PATENT OFFICE.

DANIEL E. McSHERRY, OF DAYTON, OHIO.

IMPROVEMENT IN SEEDING-MACHINES.

Specification forming part of Letters Patent No. 106,602, dated August 23, 1870.

*To all whom it may concern:*

Be it known that I, DANIEL E. MCSHERRY, of Dayton, in the county of Montgomery and State of Ohio, have invented certain new and useful Improvements in Seeding-Machines; and I do hereby declare that the following is a full, clear, and exact description thereof, reference being had to the accompanying drawing, making part of this specification, in which—

Figure 1, Plate 1, is a top view of the improved machine. Fig. 2, Plate 1, is an elevation of one side of the machine, having all the hoes arranged in the same rank. Fig. 3, Plate 1, is a cross-section of the guano-hopper. Fig. 4, Plate 1, is a cross-section of the grain-hopper. Fig. 5, Plate 1, is a cross-section of the grass-seed hopper. Fig. 6, Plate 2, is a section taken longitudinally and vertically through the machine, showing all the hoes, in full lines, arranged in the same rank, and showing part of the hoes, in dotted lines, arranged in advance of the others. Figs. 7 and 8, Plate 2, are views, showing the tube-board and one of the pivoted and adjustable guides, and also the manner of connecting a flexible tube to its funnel-shaped guide.

Similar letters of reference indicate corresponding parts in the several figures.

This invention relates to certain novel improvements on seeding-machines, adapted for sowing both grain and guano through the same drill-tubes or hoes at the same time, and also adapted for scattering grass-seed.

The nature of my invention consists, first, in providing for shifting one set of the hoes and their drag-bars, to adapt the machine for different kinds of planting by attaching every alternate drag-bar to an adjustable cross-bar, which is extended across and pivoted at its ends to the front part of the main frame, and by providing for securing the bar in the desired position, as will be hereinafter explained; second, in applying the adjustable bar between two cross-bars of the main frame in such manner that, whether this bar be adjusted forward or backward, it will be sustained and stiffened by one of said frame-bars, as will be hereinafter explained; third, in the employment, in conjunction with adjustable hoes, of a tube-board, having oblong passages through it adapted for receiving the grain-pans and guides, and allowing these parts, with the seed-tubes, to be adjusted and set forward or backward, to adapt them to corresponding adjustments given to the hoes, as will be hereinafter explained; fourth, in applying the flexible seed-tubes to funnels, which are connected to the tube-board conjointly with the seed-pans by means of pivots, as will be hereinafter explained; fifth, in arranging spirally-ribbed revolving discharging-wheels within slotted flat cups, for the purpose of effecting a regular discharge of guano or other fertilizer in a state of powder, and providing for conducting the fertilizer from said cups into the seed-pans by means of pivoted guides or troughs, as will be hereinafter explained.

To enable others skilled in the art to understand my invention, I will describe its construction and operation.

In the accompanying drawing, A is a rectangular frame, which is the main frame of the machine, and which is supported upon the revolving axle D′ of two transporting and driving wheels, D D. Across the front part of the frame A is a fixed cross-bar, A′, and between this bar and the front cross-bar of the frame is another cross-bar, B, which is connected by means of pivots $b'$ $b'$ to the side bars of the main frame. To this rocking bar B I pivot at $a$ $a$ one set of drag-bars, C C, carrying on their rear ends drill-teeth or hoes T, and between these drag-bars and their hoes I pivot a like number of drag-bars, $C^1$ $C^1$, to the fixed cross-bar A′, as shown in Figs. 1, 2, and 6. The bars C C are made of such length, relatively to the length of the bars $C^1$ $C^1$, that when the cross-bar B is adjusted, as shown in Figs. 2 and 6 in full lines, all the hoes will be in the same rank.

When it is desired to adjust the hoes of drag-bars C C forward, so as to run two ranks of hoes, one in advance of the other, rods $b$ $b$, which are received in staples beneath frame A, are removed, and the bars B turned back about its pivots $b'$ $b'$, as indicated in dotted lines, Fig. 6, in which position it is again held by the rods $b$ $b$, inserted as before. This longitudinal adjustment of the hoes of drag-bars C C is preferably effected by pivoting the extremities of bar B eccentrically, or nearer to one edge of this bar than the other, so that when the bar is turned one-half around the hoes, which are connected to it by their drag-bars, will be moved forward or backward, as the case may be.

It will be seen by reference to Fig. 6 that the bar B is so pivoted with reference to the two cross-bars between which it is arranged that the staples on this bar will bear against one or the other of said cross-bars, either in the forward or backward adjustment, thereby stiffening it against strain, at the same time strengthening the attachment of the drag-bars to the bar B. This bar B may be pivoted centrally, though I prefer to have it pivoted eccentrically, as shown.

Having provided for adjusting the teeth or hoes of one set, C, of drag-bars forward or backward, so as to run two ranks or only a a single rank of hoes, it is desirable to provide some means for giving corresponding adjustments to the seed-tubes. For this purpose I make those holes through the tube-board R which are in line with the hoes on the adjustable drag-bars C oblong longitudinally. The holes between the oblong holes for the seed-tubes of the hoes, which are attached to drag-bars $C^1$, are of the usual circular form. Each one of the seed-tubes V is secured around the contracted neck of an elliptical funnel, P, transversely through which a pivot-rod, X, is passed, which is seated into recesses $y\ y$ made into the tube-board, and its ends held in place by the turn-buttons $p\ p$, (shown clearly in Figs. 7 and 8.) I thus pivot the funnel P, to which the upper end of the flexible tube V is attached, to the seed-board, so that this funnel and tube can vibrate forward and backward in its oblong hole. By means of the same rod $x$ I also pivot the seed-pan N, which is an upwardly-flaring funnel, the smaller end of which is received into the funnel P, as shown in Fig. 8. This seed-pan or funnel N is so arranged as to receive grain from the hopper F, and guano or other fertilizers from the hopper E, as will be hereinafter explained.

The teeth or hoes T of both sets of drag-bars are constructed and applied to their bars in the usual well-known manner, and hung by means of chains $c$ from a swinging bar, $C^2$, the arms of which are pivoted to the longitudinal bars of frame A, so that this bar can be turned up and the hoes lifted free from the ground.

In the front of the axle $D'$ of the driving and transporting wheels D D, and supported upon the frame A, is a hopper having discharging devices in its bottom, for distributing guano or other suitable fertilizer in powder. This hopper is mounted on legs $E^2$ in front, and sustained by the hooks $i\ i$ behind, which hooks engage with the upper edge of a grain-hopper, F, and in rear of the axle $D'$, as shown in Fig. 6. The grain-hopper is sustained upon short legs, and provided with distributing devices, substantially as described in Letters Patent granted to me on the 13th day of December, 1864, and also on the 30th of November, 1869. In rear of the grain-box, and secured down firmly upon the frame A, is the grass-seed hopper G, which, as arranged, will discharge the seed in rear of the hoes.

The axle $D'$ of wheels D D carries a spur-wheel, $e^1$, which engages with a spur-wheel, $n^3$, on frame A, and this wheel $n^3$ engages with a spur-wheel, $m$, on shaft $E^1$. The shaft $E^1$ extends through one end of the hopper E, and has its bearings on the bottom thereof, carrying upon it a number of wheels, $j$, which correspond in number and distance apart to the hoes T. The wheels $j$ have oblique or spiral teeth on their peripheries, between which teeth are deep grooves. Arranged beneath wheels $j$, and receiving these wheels, are cups $k$, which have flat bottoms, through which oblong slots are made transversely. These flat-bottom cups, in combination with the obliquely-arranged feathers or teeth on wheels $j$, will prevent the fertilizer from clogging, and will feed it regularly through the oblong slots through the bottoms of the cups. Beneath the cups perforated slides $u^1\ u^2$ are applied to the bottom of the hopper E, and made adjustable for regulating the size of the distributing-apertures or cutting off the flow altogether. Below each seed-cup $k$ an inclined trough or guide, $s$, conducts the falling fertilizer backward into its seed-pan N, from which latter the fertilizer, with the grain falling from the hopper F, is distributed by means of the tubes T into the drills made by the hoes. A lever, L, which is pivoted to the back of the hopper F, is connected at its lower end to another lever, (not shown in the drawings,) which extends forward below hopper E, and is pivoted to the bottom slide $n^2$. By this means the slide $n^2$ can be adjusted for regulating the flow of material from said hopper.

The hopper F is provided with seed-cups H, from which the grain escapes through rear openings $t$, and falls into the seed pans or funnels N. Within each one of these cups H is a spirally-grooved wheel or discharger, I, which is applied, with its washer, on a rod, J. The rod J carries on one end a spur-wheel, $f$, which engages with a spur-wheel, $g$, that receives rotary motion from a spur-wheel, $e$, on the revolving axle $D'$. The wheel $g$ is applied to an adjustable T-shaped slotted standard, $h$, on one side of the frame A.

In rear of the grain-hopper is the grass-seed hopper G, having a perforated bottom, provided with an adjustable perforated slide, $v$, for regulating the flow of seed from this hopper. Above the slide $v$ is a toothed agitator, $r$, which receives free endwise motion from a crank, $p'$, to one arm of which a pitman-rod, $o$, is connected, which receives motion from spur-wheel $n^3$, to which the front end of this rod $o$ is connected eccentrically.

By detaching the hopper G from the frame A, and securing it to the frame A in front of the hopper E, the grass-seed can be discharged in front of the hoes. This adjustment of the hopper can be made without detaching the pitman-rod o, or the other devices which give motion to the toothed rod r.

It will be seen by reference to Figs. 7 and 8 that the flexible tubes T, which belong to the hoes of the adjustable drag-bars C, together with the funnel N and P, can be set farther back when it is desired to run all the hoes in the same rank, by removing the rods x from the recess-bearings y y in the tube-board R to the recess-bearings y' y' nearer the rear ends of the oblong apertures. This adjustment will bring the funnels into line transversely with the funnels which are over the hoes of drag-bars C¹.

Having described my invention, what I claim as new, and desire to secure by Letters Patent, is—

1. Combining part of the drag-bars with a pivoted adjustable cross-bar, B, applied to frame A in such manner as to allow the hoes which are attached thereto to be adjusted, and held either in the same rank with the hoes of bars C¹, or in a rank which is in advance of these hoes, substantially as described.

2. The fastening-rods b, or their equivalents, in combination with a pivoted adjustable cross-bar, B, having part of the drag-bars attached to it.

3. The tube-board R, with oblong apertures through it, provided with adjustable funnels and forward and rear bearings y' y', and turn-bottom p, substantially as described.

4. The tube-funnel P and seed-pan N, connected together by a pivotal bearing-rod, x, substantially as described.

5. A fertilizer-hopper, E, having spirally-ribbed wheels j, arranged in flat and slotted bottom cups k, substantially as described.

DANIEL E. McSHERRY.

Witnesses:
J. A. SHAUCK,
EDWARD BRENEMAN.